No. 667,547. Patented Feb. 5, 1901.
L. F. MILLER.
CULTIVATING PLOW.
(Application filed Sept. 1, 1900.)
(No Model.)

Witnesses
Lewis F. Miller, Inventor.

UNITED STATES PATENT OFFICE.

LEWIS F. MILLER, OF CANTON, NORTH CAROLINA.

CULTIVATING-PLOW.

SPECIFICATION forming part of Letters Patent No. 667,547, dated February 5, 1901.

Application filed September 1, 1900. Serial No. 28,807. (No model.)

*To all whom it may concern:*

Be it known that I, LEWIS F. MILLER, a citizen of the United States, residing at Canton, in the county of Haywood and State of North Carolina, have invented a new and useful Cultivating-Plow, of which the following is a specification.

My invention is an improved cultivating-plow, the object of my invention being to provide a cultivating-plow the frame of which is adapted to be adjusted so as to narrow or widen the same and with longitudinally-adjustable standards on the side bars of the frame, which standards carry the points or shovels, and suitable levers for longitudinally adjusting the standards and locking the same in place when adjusted.

My invention consists in the peculiar construction and combination of devices hereinafter fully set forth, and pointed out in the claims.

Figure 1:
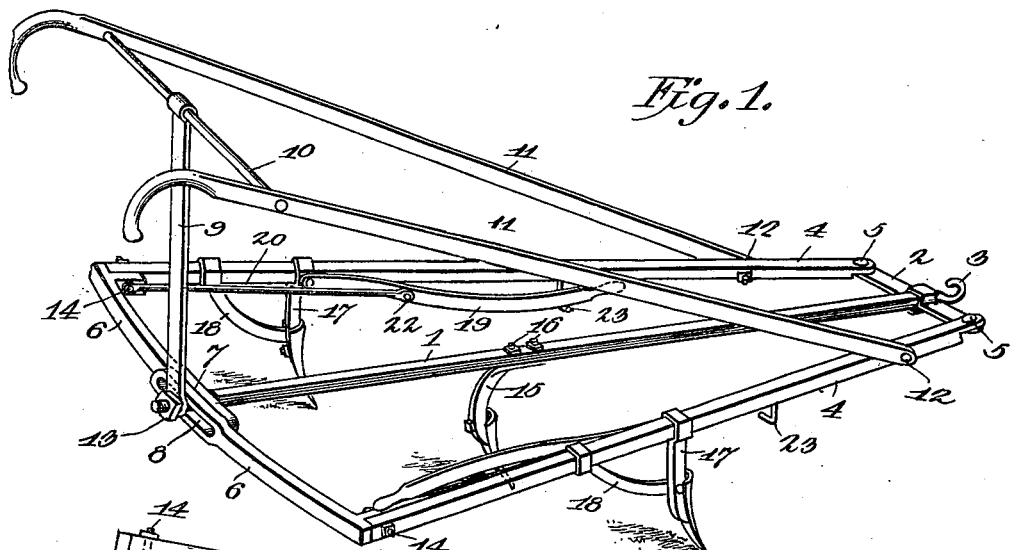
Figure 2:
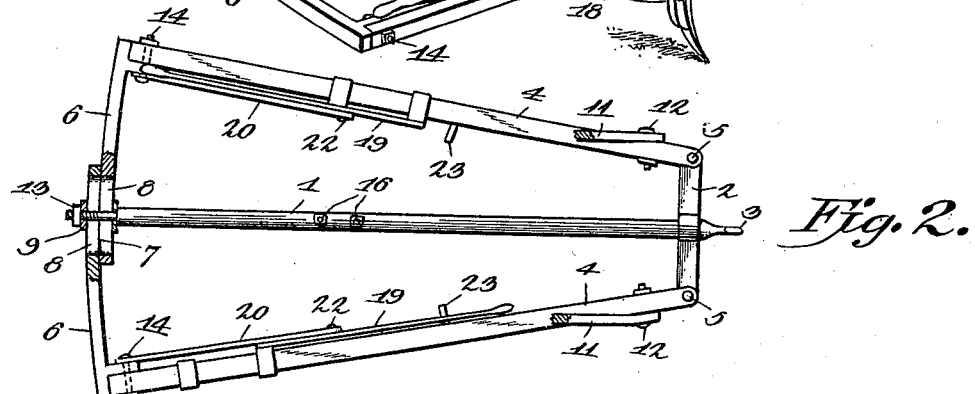
Figure 3:
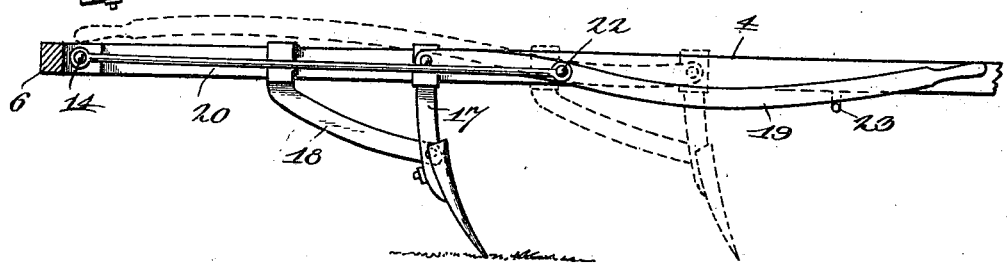

In the accompanying drawings, Figure 1 is a perspective view of a cultivating-plow embodying my improvements. Fig. 2 is a top plan view of the same, partly in section. Fig. 3 is a detail elevation, partly in section.

In the construction of my improved cultivating-plow the central bar 1, which is longitudinally disposed, is secured near its front end to the center of a cross-bar 2 of suitable length. The bar 1 is provided at its front end with a hook or other suitable device, as at 3, for the attachment of a singletree. Side bars 4 have their front ends pivotally connected to the ends of the cross-bar 2 by bolts 5. The rear ends of the said side bars 4 are secured to arms 6, the inner ends of which overlap each other, as at 7, the said overlapping ends of the said arms 6 being provided with longitudinal registering-slots 8. The rear portion of the central bar 1 extends through the said slot, and to the rear end of the said bar 1 is secured the lower end of a vertical brace-bar 9, the upper end of which supports a cross-bar 10, that connects the handle-levers 11 near their rear ends. The front ends of the said handle-levers are bolted or otherwise suitably secured to the side bars 4, as at 12.
It will be understood from the foregoing description and by reference to the drawings that the rear portion of the frame may be narrowed or widened, and when the side bars 4 are adjusted at an appropriate angle the same are locked and secured in such adjustment by means of a nut 13, which is screwed onto the rear threaded end of the center bar 1. The said nut also serves to clamp the rear end of the said center bar and the lower end of the brace-bar 9 firmly to the overlapping portion 7 of the arms 6. The said arms may be either formed integrally with the side bars 4 or they may be bolted thereto, as shown at 14.

A foot or standard 15 is attached to the center bar by bolts 16. The said foot or standard is adapted for the attachment of any suitable form of cultivating point or shovel, as shown. On each of the side bars 4 is secured a longitudinally-adjustable foot or standard 17, having a rearward-extending brace-arm 18, which is also engaged with and adapted to slide on the said bar. The said feet or standard 17 are adapted for the attachment of suitable cultivating points or shovels. To the inner side of each adjustable foot or standard 17, at the upper end thereof, is pivotally attached the lower end of a lever 19. Link-rods 20 are pivotally connected to the rear corners of the cultivator-frame, on the inner sides thereof, by bolts 14, which, as here shown, also serve to connect the arms 6 to the rear ends of the side bars 4. The front ends of the said link-bars are connected to the levers 19, as at 22. It will be understood that by means of the said levers and link-bars the feet or standards 17 may be adjusted longitudinally on the side bars 4 of the frame, so as to dispose the cultivating points or shovels at any appropriate relation to each other, as may be required. The points or shovels may be disposed either abreast of each other or on an oblique line, with either of the standards in advance, as may be required. The levers 19 not only serve to adjust the standards longitudinally on the side bars of the frame, but by coaction and engagement with the side bars of the frame serve to lock the said standards in position when adjusted. As here shown the said side bars are provided with stops 23, which engage and detain the levers and support the same when the standards 17 are adjusted; but it will be understood that by lengthening the said levers the outer ends thereof may be engaged by the front and rear ends of the frame and supported thereby. Other modifications may be made in the construction of my improved cultivating-plow within the scope of my invention.

As shown in the drawings, my invention is equipped as a three-plow cultivator. The central standard 16 may, however, be removed to adapt my invention for use as a double-shovel plow, and the standards 17 being longitudinally movable on the bars 4 the shovels attached thereto may be reversed or either disposed in advance of the other to enable the double-shovel plow to be used on hillsides.

Having thus described my invention, I claim—

1. In a cultivator, the combination with the bars of a frame, of standards longitudinally adjustable on said bars, levers pivotally attached to said standards and link-rods connecting said levers to a fixed point, substantially as described.

2. In a cultivator, the combination of a frame, having longitudinal bars, standards longitudinally movable on said bars, levers pivotally attached to said standards, link-rods connected to said levers and to fixed points at the rear ends of said bars, and stops to lock said levers at the limits of the movement thereof, said stops and levers coacting to adjust and lock said standards, substantially as described.

In testimony that I claim the foregoing as my own I have hereto affixed my signature in the presence of two witnesses.

LEWIS F. MILLER.

Witnesses:
JOHN D. HOLTSCLAM,
WALTER A. HOLTSCLAM.